United States Patent Office 3,002,968
Patented Oct. 3, 1961

3,002,968
BISMETHYLENEDIOXY STERIODS
Seymour Bernstein, New City, and John J. Brown, Pearl River, N.Y., and Robert H. Lenhard, Ridgefield Park, N.J., assignors to American Cyanamid Company, New York, N.Y., a corporation of Maine
No Drawing. Filed Sept. 12, 1960, Ser. No. 55,143
14 Claims. (Cl. 260—239.55)

This invention relates to a method for the preparation of 19-nor steroids of the pregnene series. More particularly, it relates to the preparation of 17α,21-dihydroxy-19-nor steroids of the pregnene series by pyrolysis and the preparation of intermediates useful in said process.

The present process comprises pyrolysis of 17,20;20,21-bismethylenedioxy-1,4-pregnadien-3-ones to yield the corresponding 19-nor-3-hydroxy steroids which can be illustrated as follows:

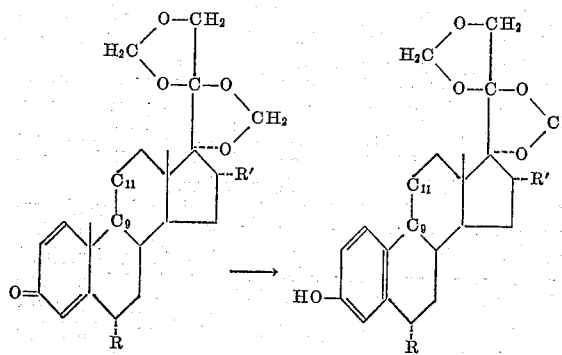

wherein R and R' are members of the group consisting of hydrogen and methyl radicals —C$_9$—C$_{11}$— is a member of the group consisting of

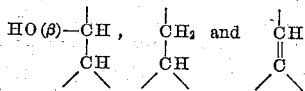

radicals.

The starting materials in the present process can be prepared by the methods described in United States Patents 2,888,456 and 2,888,457 and as hereinafter described in the examples. The starting compounds can be, for example, 6α-methyl-17,20;20,21-bismethylenedioxy-1,4-pregnadien-3-one; 11β-hydroxy-17,20;20,21-bismethylenedioxy-1,4-pregnadien-3-one; 11β-hydroxy-16α-methyl-17,20;20,21-bismethylenedioxy-1,4-pregnadien-3-one; 11β-hydroxy-6α-methyl-17,20;20,21-bismethylenedioxy-1,4-pregnadien-3-one; 16α-methyl-17,20;20,21-bismethylenedioxy-1,4-pregnadien-3-one; 17,20;20,21-bismethylenedioxy-1,4-pregnadiene-3-one; 6α,16α-dimethyl-17,20;20,21-bismethylenedioxy-1,4-pregnadien-3-one; 11β-hydroxy-6α,16α-dimethyl-17,20;20,21-bismethylenedioxy-1,4-pregnadien-3-one; 17,20;20,21-bismethylenedioxy-1,4,9(11)pregnatrien-3-one and the like.

The novel pyrolysis of this invention is accomplished by passing the starting 1,4-pregnadien-3-one through a hot tube. Because of the high temperature range, 400° to 750° C., a heat resistant material such as quartz is used for the tube, which is ordinarily packed with quartz particles. Generally, the starting steroid is suspended in a neutral carrier such as high-boiling liquid hydrocarbons, a mixture of such hydrocarbons and tetrahydronaphthalene, or some other neutral liquid capable of withstanding the high temperature. The reaction is carried out in a nitrogen atmosphere, the pressure of nitrogen being varied to alter the speed with which the mixture is forced through the tube. Generally, the higher the temperature, the faster the pyrolysis and the faster the mixture is passed through the tube.

The steroids of the present invention are useful as intermediates in the preparation of 17α,21-dihydroxy-19-nor steroids of the pregnene series from the corresponding 10-methyl steroids. The 19-nor compounds are useful as anti-inflammatory agents. The use of anti-inflammatory agents in the treatment of arthritis, rheumatism and similar conditions is well known.

The following flow-sheet represents the process of the present invention wherein the steroid may be substituted in the 6 and/or 16-positions.

FLOWSHEET

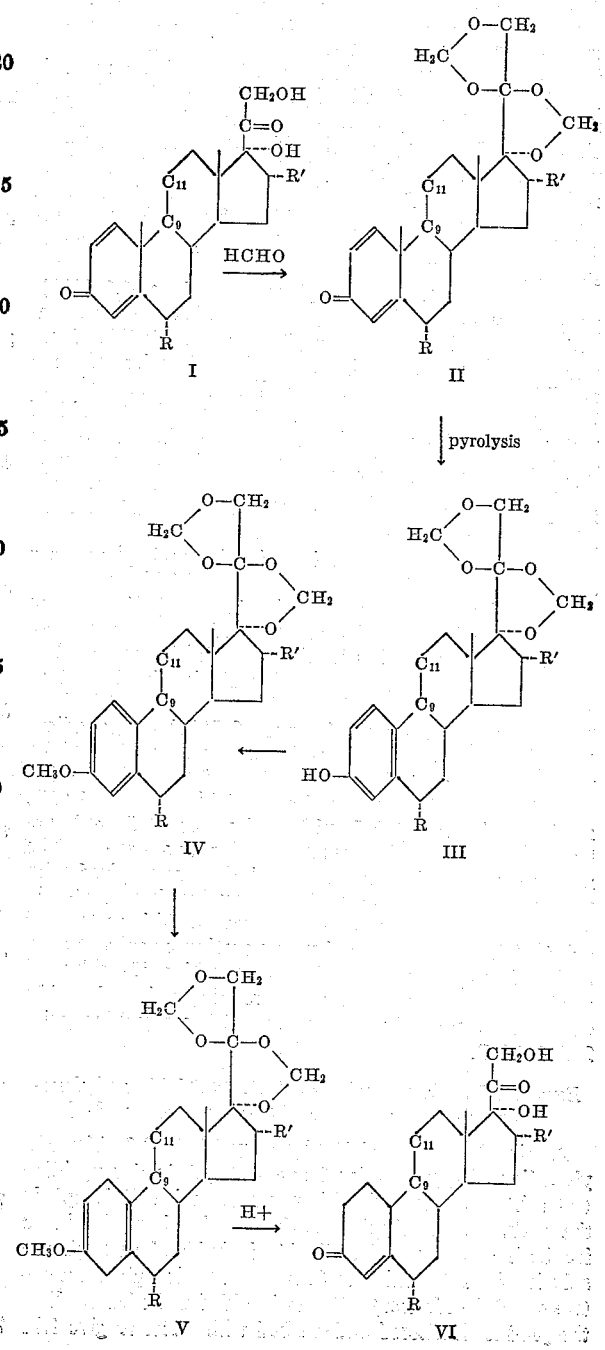

in which R, R' are as defined above and $C_9$—$C_{11}$ is a member of the group consisting of

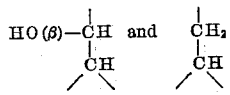

The following examples illustrate in greater detail the process of the present invention.

*Example I.—Preparation of 19-norhydrocortisone*

11β - hydroxy - 17,20;20,21 - bismethylenedioxy - 1,4-pregnadien-3-one (500 mg.) and 50 ml. of light white mineral oil (a mixture of liquid hydrocarbons from petroleum) are mixed for 15 minutes in a Waring blendor and the resulting suspension is added dropwise (1 drop/sec.) into a heated vertical quartz tube (8 mm. internal diameter) packed with broken quartz particles for a length of 34.5 cm. The tube is heated to 550° C. over 25.5 cm. from the top of the packing and during the addition of the suspension a slow stream of nitrogen is passed through the tube. The cooled effluent is extracted with aqueous potassium hydroxide (5%) and the extract is washed with ether. The washed alkaline extract is acidified (Congo red) with hydrochloric acid (5%) and the solid which separates is extracted into methylene chloride. The methylene chloride extract is washed with water and dried with anhydrous sodium sulfate. The residue obtained by removal of solvent crystallizes from acetone to give 17,20;20,21-bismethylenedioxy-19-nor-1,3,5(10)-pregnatriene-3,11β-diol as prisms, melting point 310–313° C.

The 17,20;20,21 - bismethylenedioxy-19-nor-1,3,5(10)-pregnatriene-3,11β-diol (prepared above) (500 mg.), anhydrous potassium carbonate (1 g.), methyl iodide (5 g.) and absolute ethanol (15 ml.) are heated under refluxing conditions for four hours. The filtered reaction mixture is evaporated and the residue is collected with the aid of water. The solid so obtained crystallizes from methanol to give 3-methoxy-17,20;20,21-bismethylenedioxy-19-nor-1,3,5(10)-pregnatrien-11β-ol as needles (360 mg.), melting point 198–200° C. which rises to 201–202° C. upon further crystallization.

Lithium wire (700 mg.) is added in small pieces to a stirred solution of 3-methoxy-17,20;20,21-bismethylenedioxy-19-nor-1,3,5(10)-pregnatrien-11β-ol (700 mg.) in liquid ammonia (200 ml.), dioxane (35 ml.), and ethanol (10 ml.). Fifteen minutes after the addition is complete the lithium has dissolved and the solution is allowed to evaporate to dryness. The product, 3-methoxy-17,20;20, 21 - bismethylenedioxy - 19 - nor - 2,5(10) - pregnadien-11β-ol, is collected by the addition of water followed by filtration. It crystallizes as needles (500 mg.), melting point 139–170° C., from methanol. This compound (250 mg.), acetic acid (12.5 ml.) and water (6.5 ml.) are heated under refluxing conditions for two hours. The mixture is diluted with water and then neutralized with sodium hydrogen carbonate. The product is extracted in ethyl acetate and the extract is washed with water and dried. The gum obtained by evaporation of solvent crystallizes from methanol-ethyl acetate to give 19-norhydrocortisone as needles (110 mg.), melting point 250–252° C. The substantially pure compound has a melting point 255–257° C.

*Example II.—Preparation of 17,20;20,21-bismethylenedioxy-19-nor-1,3,5(10),9(11)-pregnatetraen-3-ol*

A stirred solution of 11β-hydroxy-17,20;20,21-bismethylenedioxy-1,4-pregnadien-3-one (2.0 g.) in dry pyridine (25 ml.) is treated with N-bromoacetamide (1.03 g.) in the dark. After 15 minutes, the reaction is cooled in an ice bath and dry sulfur dioxide is bubbled through the solution for a few minutes (until the solution gives a negative starch-iodide test). Water is added and after cooling, the product is filtered and washed with water to give 1.71 g. of product, melting point 202–205° C. Recrystallization from acetone-petroleum ether gives 1.62 g. of pure 17,20;20,21 - bismethylenedioxy - 1,4,9(11) - pregnatrien-3-one, melting point 205–209° C.

A suspension of 17,20;20,21-bismethylenedioxy-1,4, 9(11)-pregnatrien-3-one (3.0 g.) in mineral oil (100 ml.) is pyrolized as in Example I. Addition of petroleum ether to the cooled mineral oil eluate gives 2.06 g. of crude product, melting point 220–240° C. The latter is chromatographed over Florisil (synthetic magnesium silicate) and the product is eluted with methylene chloride. Recrystallization from acetone-petroleum ether gives 0.96 g. of product melting at 253–257° C. The analytical sample melts at 256.5–261° C.

*Example III.—Preparation of 6α-methyl-19-norhydrocortisone*

The compound, 11β,17α,21-trihydroxy-6α-methyl-1,4-pregnadiene-3,20-dione, (2 g.) in chloroform (80 ml.) is treated with concentrated hydrochloric acid (20 ml.) and formalin (20 ml.) and the mixture is stirred at room temperature for 24 hours. The chloroform layer is separated and is washed with aqueous sodium hydrogen carbonate, water and dried. The product, 11β-hydroxy-6α-methyl-17,20;20,21-bismethylenedioxy-1,4-pregnadien - 3 - one, is obtained by removal of solvent followed by crystallization of the residue from acetone-petroleum ether.

The 11β-hydroxy-6α-methyl-17,20;20,21-bismethylenedioxy-1,4-pregnadien-3-one is pyrolyzed as in Example I above. The product, 6α-methyl-17,20;20,21-bismethylenedioxy-19-nor-1,3,5(10)-pregnatriene-3,11β-diol, separates from ethyl acetate-petroleum ether.

The 6α - methyl-17,20;20,21-bismethylenedioxy-19-nor-1,3,5(10)-pregnatriene-3,11β-diol is treated with methyl iodide and anhydrous potassium carbonate as described in Example I. The methyl ether so obtained is crystallized from aqueous methanol to give 3-methoxy-6α-methyl - 17,20;20,21 - bismethylenedioxy - 19 - nor - 1,3,5(10)-pregnatrien-11β-ol.

A solution of 3-methoxy-6α-methyl-17,20;20,21-bismethylenedioxy-19-nor-1,3,5(10)-pregnatrien-11β-ol (700 mg.) in liquid ammonia (200 ml.), dioxane (35 ml.) and ethanol (10 ml.) is treated with lithium wire (700 mg.). When the lithium has dissolved, the solution is evaporated to dryness and the product, 3-methoxy-6α-methyl-17, 20;20,21 - bismethylenedioxy - 19 - nor - 2,5(10) - pregnadien-11β-ol is collected with the aid of water and is crystallized from methanol. This product (500 mg.), acetic acid (25 ml.) and water (13 ml.) are heated under reflux for two hours. The product, 6α-methyl-19-norhydrocortisone, is isolated as before and crystallizes from ethyl acetate-petroleum ether.

*Example IV.—Preparation of 16α-methyl-19-norhydrocortisone*

The compound, 11β,17α,21-trihydroxy-16α-methyl-1,4-pregnadiene-3,20-dione, (1 g.) is added to a mixture of chloroform (50 ml.), concentrated hydrochloric acid (10 ml.), and formalin (10 ml.) and the mixture is stirred for 35 hours at room temperature. The product, 11β-hydroxy - 16α - methyl - 17,20;20,21 - bismethylenedioxy-1,4-pregnadien-3-one, is isolated as described in Example I and is crystallized from ethyl acetate-petroleum ether.

A suspension of 11β-hydroxy-16α-methyl-17,20;20,21-bismethylenedioxy-1,4-pregnadien-3-one (1 g.) in light white mineral oil (100 ml.) is pyrolyzed as in Example I above. The product, 16α-methyl-17,20;20,21-bismethylenedioxy - 19 - nor - 1,3,5(10) - pregnatriene - 3,11β-diol, is crystallized from acetone-petroleum ether.

The 16α-methyl - 17,20;20,21 - bismethylenedioxy-19-nor-1,3,5(10)-pregnatriene-3,11β-diol is converted to the methyl ether as described in Example III. It crystallizes from aqueous methanol to give substantially pure 3-methoxy - 16α - methyl-17,20;20,21-bismethylene-dioxy-19-nor-1,3,5(10)-pregnatrien-11β-ol.

By the same procedure described in the previous example, 3-methoxy-16α-methyl-17,20;20,21-bismethylenedioxy-19-nor-1,3,5(10)-pregnatrien-11β-ol is converted into 16α-methyl-19-norhydrocortisone. The product crystallizes from aqueous acetone to give a substantially pure product.

*Example V.—Preparation of 17α,21-dihydroxy-16α-methyl-19-nor-4-pregnene-3,20-dione*

To concentrated hydrochloric acid (10 ml.) and formalin (10 ml.) is added a solution of 17α,21-dihydroxy-16α-methyl-1,4-pregnadiene-3,20-dione (1 g.) in chloroform (70 ml.). The mixture is stirred at room temperature for 30 hours and the product is isolated as described in Example I. The 16α-methyl-17,20;20,21-bismethylenedioxy-1,4-pregnadien-3-one is crystallized from ethyl acetate-petroleum ether.

A suspension of 16α-methyl-17,20;20,21-bismethylenedioxy-1,4-pregnadien-3-one in light mineral oil is pyrolyzed at about 550° C. The product, 16α-methyl-17,20;20,21 - bismethylenedioxy-19-nor-1,3,5(10)-pregnatrien-3-ol is crystallized from acetone.

The compound, 16α-methyl-17,20;20,21-bismethylenedioxy-19-nor-1,3,5(10)-pregnatrien-3-ol, is converted into 3-methoxy-16α-methyl - 17,20;20,21 - bismethylenedioxy-19-nor-1,3,5(10)-pregnatriene by use of methyl iodide as in previous examples. This compound separates from aqueous methanol.

The compound, 3-methoxy-16α-methyl-17,20;20,21-bismethylenedioxy-19-nor-1,3,5(10) - pregnatriene when subjected to lithium in liquid ammonia followed by acid hydrolysis gives 17α,21-dihydroxy-16α-methyl-19-nor-4-pregnene-3,20-dione. This product is crystallized from ethyl acetate-petroleum ether.

*Example VI.—Preparation of 17α,21-dihydroxy-19-nor-4-pregnene-3,20-dione*

The steroid, 17α,21-dihydroxy-1,4-pregnadiene-3,20-dione (10 g.) in chloroform (400 ml.) is treated with concentrated hydrochloric acid (100 ml.) and formalin (100 ml.) and the mixture is stirred at room temperature for 48 hours. The product, 17,20;20,21-bismethylenedioxy-1,4-pregnadien-3-one is isolated as described in Example I and crystallized from acetone-petroleum ether.

The 17,20;20,21-bismethylenedioxy-1,4-pregnadien-3-one is pyrolyzed at about 550° C. as described in Example I. The product, 17,20;20,21-bismethylenedioxy-19-nor-1,3,5(10)-pregnatrien-3-ol is crystallized from ethyl acetate-petroleum ether.

Treatment of 17,20;20,21-bismethylenedioxy-19-nor-1,3,5(10)-pregnatrien-3-ol with methyl iodide and anhydrous potassium carbonate gives 3-methoxy-17,20;20,21-bismethylenedioxy - 19 - nor-1,3,5(10)-pregnatriene. This compound crystallizes from acetone-petroleum ether.

The 3-methoxy-17-20;20,21-bismethylenedioxy-19-nor-1,3,5(10)-pregnatriene is reduced with lithium in liquid ammonia and the resulting diene is hydrolyzed with aqueous acetic acid as in Example I to give 17α,21-dihydroxy-19-nor-4-pregnene-3,20-dione which crystallizes from ethyl acetate.

*Example VII.—Preparation of 6α,16α-dimethyl-19-norhydrocortisone*

The compound, 11β,17α,21-trihydroxy-6α,16α-dimethyl-1,4-pregnadiene-3,20-dione (1.5 g.) prepared as described in S. African application Number 3230/58 is added to a mixture of chloroform (60 ml.), concentrated hydrochloric acid (15 ml.) and formalin (15 ml.). The mixture is stirred for 40 hours at room temperature. Isolation of the product is carried out as hereinbefore described and the pure compound, 11β-hydroxy-6α,16α-dimethyl - 17,20;20,21 - bismethylenedioxy - 1,4-pregnadien-3-one is obtained by crystallization from acetone-petroleum ether.

The pregnadiene prepared immediately above is pyrolyzed at about 550° C. as described in Example I. The product, 6α,16α-dimethyl-17,20;20,21-bismethylenedioxy-19-nor-1,3,5(10)-pregnatriene-3,11β-diol is crystallized from equal parts of ethyl acetate-petroleum ether.

Treatment of 6α,16α-dimethyl-17,20;20,21-bismethylenedioxy - 19 - nor-1,3,5(10)-pregnatrien-3,11β-diol with methyl iodide under the conditions of the previous examples gives 3-methoxy-6α,16α-dimethyl-17,20;20,21-bismethylenedioxy - 19 - nor - 1,3,5(10)-pregnatrien-11β-ol. The compound crystallizes from acetone-petroleum ether.

As in the previous example, 3-methoxy-6α,16α-dimethyl - 17,20;20,21 - bismethylenedioxy - 19-nor-1,3,5(10)-pregnatrien-11β-ol is treated with lithium in liquid ammonia and the product is hydrolyzed with aqueous acetic acid to give 6α,16α-dimethyl-19-nor-hydrocortisone which separates from aqueous methanol.

*Example VIII.—Preparation of 17α,21-dihydroxy-6α-methyl-19-nor-4-pregnene-3,20-dione*

Concentrated hydrochloric acid (15 ml.) and formalin (15 ml.) is added to a solution of 17α,21-dihydroxy-6α-methyl-1,4-pregnadiene-3,20-dione (1.5 g.) in chloroform (100 ml.). The mixture is stirred at room temperature for 24 hours and the product is then isolated as in Example 1. The 6α-methyl-17,20;20,21-bismethylenedioxy-1,4-pregnadiene-3-one is crystallized from methanol.

A suspension of 6α-methyl-17,20;20,21-bismethylenedioxy-1,4-pregnadien-3-one in light mineral oil is pyrolyzed as in the previous examples. The 6α-methyl-17,20;20,21-bismethylenedioxy-19-nor-1,3,5(10) - pregnadien-3-ol so obtained is crystallized from acetone.

The 6α-methyl-17,20;20,21-bismethylenedioxy - 19-nor-1,3,5(10)-pregnatrien-3-ol is treated with methyl iodide as in Example III to give 3-methoxy-6α-methyl-17,20;20,21 - bismethylenedioxy - 19 - nor-1,3,5(10)-pregnatriene which is crystallized from acetone-petroleum ether.

Using the same procedure as in the previous examples, 3-methoxy-6α-methyl - 17,20;20,21-bismethylene-dioxy-19-nor-1,3,5(10)-pregnatriene is converted into 17α,21-dihydroxy-6α-methyl-19-nor-4-pregnene-3,20-dione, the pure product being obtained by crystallization from aqueous methanol.

*Example IX.—Preparation of 17α,21-dihydroxy-6α,16α-dimethyl-19-nor-4-pregnene-3,20-dione*

The compound, 17α,21-dihydroxy-6α,16α-dimethyl-1,4-pregnadiene-3,20-dione (5 g.) in chloroform (200 ml.) is treated with concentrated hydrochloric acid (50 ml.) and formalin (50 ml.) and the mixture is stirred at room temperature for 40 hours. The product is isolated as described in the preceding examples. Crystallization from acetone gives pure 6α,16α-dimethyl-17,20;20,21-bismethylenedioxy-1,4-pregnadien-3-one.

6α,16α - dimethyl - 17,20;20,21-bismethylenedioxy-1,4-pregnadien-3-one is pyrolyzed at 550° C. as in the previous examples to give 6α,16α-dimethyl-17,20;20,21-bismethylenedioxy-19-nor-1,3,5(10)-pregnatrien-3-ol. This compound separates from methanol.

The compound, 3-methoxy-6α,16α-dimethyl-17,20;20, 21 - bismethylenedioxy-19-nor-1,3,5(10)-pregnatriene is prepared by treating 6α,16α-dimethyl-17,20;20,21-bismethylenedioxy - 19-nor-1,3,5(10)-pregnatrien-3-ol with methyl iodide and anhydrous potassium carbonate as described in Example I. The pure compound is obtained by crystallization from ethyl acetate-petroleum ether.

Treatment of 3-methoxy-6α,16α-dimethyl-17,20;20,21-bismethylenedioxy - 19 - nor-1,3,5(10)-pregnatriene with lithium in liquid ammonia followed by acid hydrolysis as in Example I, gives 17α,21-dihydroxy-6α,16α-dimethyl-19-nor-4-pregnene-3,20-dione which crystallizes from acetone-petroleum ether.

We claim:
1. The compound 17,20;20,21-bismethylenedioxy-19-nor-1,3,5(10),9(11)-pregnatetraen-3-ol.
2. The compound 17,20;20,21-bismethylenedioxy-19-nor-1,3,5(10)-pregnatriene-3,11β-diol.
3. The compound 17,20;20,21-bismethylenedioxy-19-nor-1,3,5(10)-pregnatrien-3-ol.
4. The compound 6α-methyl-17,20;20,21-bismethylenedioxy-19-nor-1,3,5(10)-pregnatriene-3-11β-diol.
5. The compound 16α-methyl-17,20;20,21-bismethylenedioxy-19-nor-1,3,5(10)-pregnatrien-3-ol.
6. The compound 16α-methyl-17,20;20,21-bismethylenedioxy-19-nor-1,3,5(10)-pregnatriene-3,11β-diol.
7. The compound 6α,16α-dimethyl-17,20;20,21-bismethylenedioxy-19-nor-1,3,5(10)-pregnatriene-3,11β-diol.
8. The compound 3-methoxy-17,20;20,21-bismethylenedioxy-19-nor-1,3,5(10)-pregnatrien-11β-ol.
9. The compound 3-methoxy-6α-methyl-17,20;20,21-bismethylenedioxy-19-nor-1,3,5(10)-pregnatrien-11β-ol.
10. The compound 3-methoxy-16α-methyl-17,20;20,21-bismethylenedioxy-19-nor-1,3,5(10)-pregnatrien-11β-ol.
11. The compound 3-methoxy-6α,16α-dimethyl-17,20;20,21-bismethylenedioxy-19-nor-1,3,5(10)-pregnatrien-11β-ol.
12. A compound having the formula:

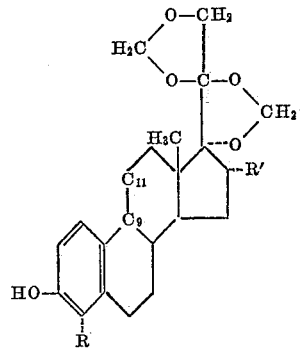

wherein R and R′ are members of the group consisting of hydrogen and methyl radicals and —$C_9$—$C_{11}$ is a trivalent radical of the group consisting of

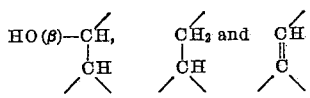

radicals.

13. A compound having the formula:

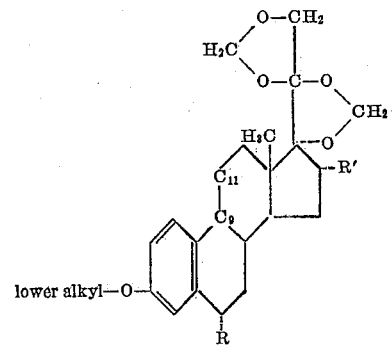

wherein R and R′ are members of the group consisting of hydrogen and methyl radicals and —$C_9$—$C_{11}$ is a trivalent radical of the group consisting of

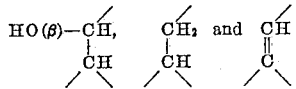

radicals.

14. A compound having the formula:

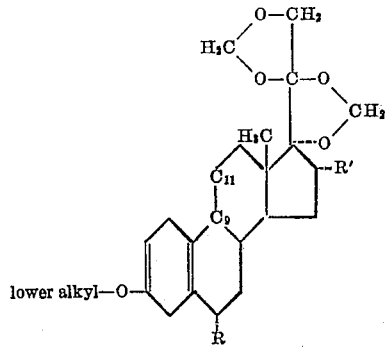

wherein R and R′ are members of the group consisting of hydrogen and methyl radicals and —$C_9$—$C_{11}$ is a trivalent radical of the group consisting of

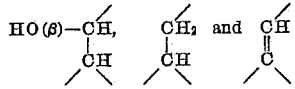

radicals.

References Cited in the file of this patent
UNITED STATES PATENTS 2,874,173  Hott et al. _____ Feb. 17, 1959
2,884,418  Sondheimer et al. _____ Apr. 28, 1959

UNITED STATES PATENT OFFICE
CERTIFICATION OF CORRECTION

Patent No. 3,002,968            October 3, 1961

Seymour Bernstein et al.

It is hereby certified that error appears in the above numbered patent requiring correction and that the said Letters Patent should read as corrected below.

Column 7, lines 31 to 45, the formula should appear as shown below instead of as in the patent:

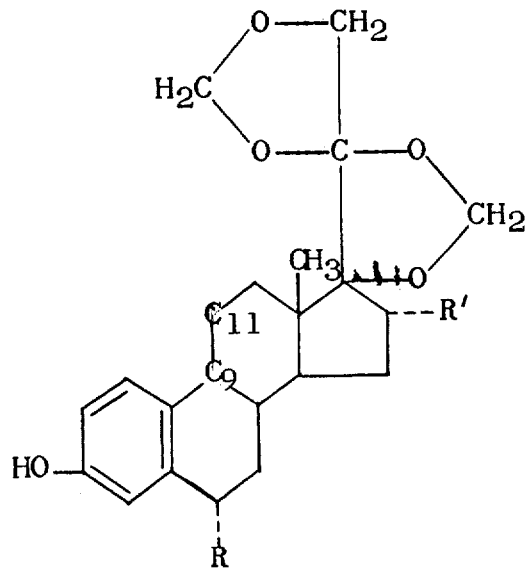

Signed and sealed this 19th day of June 1962.

(SEAL)
Attest:

ERNEST W. SWIDER            DAVID L. LADD
Attesting Officer            Commissioner of Patents